March 11, 1930.  M. M. ARMSTRONG  1,750,501
BATTERY CONNECTER
Filed Oct. 16, 1926
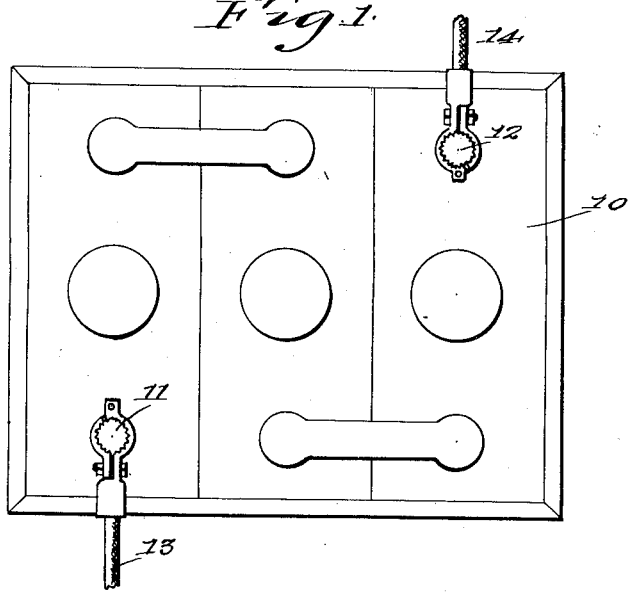
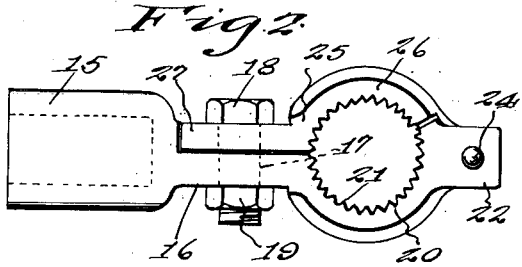
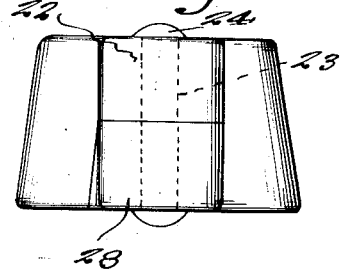
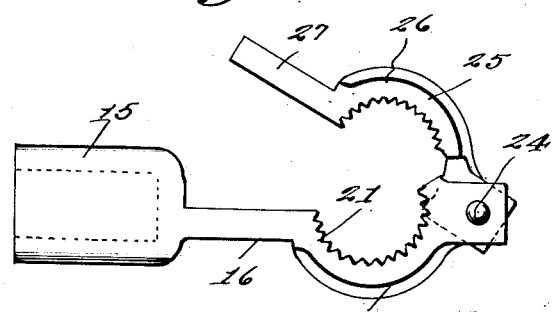
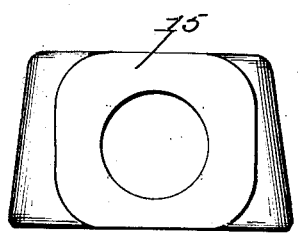
M. M. Armstrong INVENTOR Patented Mar. 11, 1930

1,750,501

UNITED STATES PATENT OFFICE

MAURICE M. ARMSTRONG, OF NEW HARMONY, INDIANA

BATTERY CONNECTER

Application filed October 16, 1926. Serial No. 142,071.

The object of this invention is to provide improved means for connecting cables or conductors to a storage battery, the device being useful under any similar conditions.

A further object is to provide a connecter which shall include a plurality of serrated jaws, one of which is pivoted for movement with reference to the other, both of the jaws having inner curved portions, for direct cooperation with the battery post.

A further object is to provide a device which will insure good electrical connection, regardless of the condition of the battery post, which may have become corroded.

A further object is to provide a device which shall include a main portion having a socket therein for receiving the end of the cable, a shank portion providing for the accommodation of a transversely extending bolt, and a curved jaw including an offset portion for pivotal connection with a complementary jaw curved in the opposite direction and provided with teeth for engaging the battery post.

With the foregoing and other objects in view, the invention consists in the novel construction and arrangement of elements described, illustrated and claimed, it being understood that modifications may be made within the scope of the claim, without departing from the spirit of the invention.

In the drawings forming part of this application,

Figure 1 shows a battery in top plan, with the connecting devices applied to the battery terminals.

Figure 2 is a plan view, on a large scale, showing one of the connecters detached.

Figure 3 shows the structure of Figure 1, with the movable jaw in open position, the bolt being omitted.

Figure 4 shows the hinge part of the device, in elevation.

Figure 5 is an end view, looking from the left in Figure 2 or in Figure 3.

A storage battery is shown conventionally, and is designated 10, the posts or terminals being shown at 11 and 12. The cables leading to the connecters are designated 13 and 14, and one of the connecters will be described in detail, as indicated below.

The main portion of the connecter or clamp includes the socket member 15 for receiving the end of one of the cables, and further includes a shank portion 16 apertured at 17 for the accommodation of a bolt 18. This bolt passes thru both elements of the clamp, and is retained by nut 19.

Formed with elements 15 and 16 is a curved jaw 20 having teeth 21 on the inner concave side thereof, providing a serrated surface. An end member 22 is apertured at 23 and receives a pin 24 by means of which the main jaw is connected with a pivoted element.

The movable jaw 25 includes the curved portion 26, serrated as shown, and this jaw further includes the shank portion 27, apertured for the bolt 18, and the end portion 28 apertured for the pin 24, previously mentioned. The end portions 28 and 22, of the respective elements of the clamp are in reverse relation, as illustrated in Figure 4.

The positive grip produced by a clamp of this type is such that vibration will not affect the character of the connection, and if the post is over-size, or under-size, the connection can be made as quickly and as effectively, both from a mechanical and electrical standpoint, as would be the case under the most favorable conditions. Any suitable metal may be employed, but non-corrosive bronze, with a lead coating, is regarded satisfactory, and the cost of manufacture is low.

Having thus described the invention, what I claim is:

A battery terminal clamp comprising a pair of clamping jaws pivotally connected together at one end, the opposite end portions of said jaws being extended and provided with openings to receive a clamping bolt, the extended end portion of one of said jaws being formed with a socket extending laterally therefrom past the end of the other jaw to receive an electrical conduit, and a clamping bolt passing through the openings in said extended end portions, said socket portion opposite the extended end portion of said other jaw being flattened to provide a side surface, and said extended portion of said other jaw having an end face to oppose the flattened side of said socket when the jaws are closed.

In testimony whereof I affix my signature.

MAURICE M. ARMSTRONG.